US012704113B2

(12) United States Patent
Moser

(10) Patent No.: US 12,704,113 B2
(45) Date of Patent: Aug. 11, 2026

(54) METHOD FOR TRAINING A MACHINE LEARNING MODEL USABLE FOR DETERMINING A REMAINING USEFUL LIFE OF A WIND TURBINE

(71) Applicant: Wolfgang Moser, Essen (DE)

(72) Inventor: Wolfgang Moser, Essen (DE)

(73) Assignee: RWE Renewables Europe & Australia GmbH, Essen (DE)

( * ) Notice: Subject to any disclaimer, the term of this patent is extended or adjusted under 35 U.S.C. 154(b) by 0 days.

(21) Appl. No.: 18/511,216

(22) Filed: Nov. 16, 2023

(65) Prior Publication Data

US 2024/0084783 A1 Mar. 14, 2024

Related U.S. Application Data

(63) Continuation of application No. PCT/EP2022/061701, filed on May 2, 2022.

(30) Foreign Application Priority Data

May 26, 2021 (DE) ..................... 10 2021 113 547.8

(51) Int. Cl.
*F03D 17/00* (2016.01)
*G05B 23/02* (2006.01)

(52) U.S. Cl.
CPC ..... *F03D 17/0065* (2023.08); *G05B 23/0283* (2013.01); *F05B 2260/80* (2013.01); *F05B 2270/709* (2013.01)

(58) Field of Classification Search
CPC . F03D 17/0065; F03D 7/045; G05B 23/0283; G05B 13/0265; F05B 2260/80;
(Continued)

(56) References Cited

U.S. PATENT DOCUMENTS

2012/0200699 A1* 8/2012 Bunge ..................... F03D 13/35 73/455
2014/0100703 A1 4/2014 Düll et al.
(Continued)

FOREIGN PATENT DOCUMENTS

CA 3072045 * 2/2019 ............. G05B 19/10
CN 110147624 * 8/2019 ............. G06F 17/18
(Continued)

OTHER PUBLICATIONS

Ferri, F.J. [u.a.]: Comparative Study of Techniques for Large-Scale Feature Selection. In: Machine Intelligence and Pattern Recognition, Bd. 16, 1994, S. 403-413.—ISSN 0923-0459 (p). DOI: 10.1016/B978-0-444-81892-8.50040.7. https://citeseerx.ist.psu.edu/pdf/5fedabbb3957bbb442802e012d829ee0629a01b6.
(Continued)

*Primary Examiner* — Alexander Satanovsky
(74) *Attorney, Agent, or Firm* — Reinhart Boerner Van Deuren P.C.

(57) ABSTRACT

The application relates to a method, in particular a computer-implemented method, for training a machine learning model usable for determining a remaining useful life of a wind turbine, including providing a plurality of operation data sets of a reference wind turbine, providing a plurality of load data sets of the reference wind turbine, wherein a load data set is based on at least one load parameter measured at the reference wind turbine, and generating a plurality of wind turbine training data sets for training a machine learning model by synchronously assigning a respective operation data set with a respective load data set.

20 Claims, 5 Drawing Sheets

(58) Field of Classification Search
CPC ............ F05B 2270/709; F05B 2260/84; F05B 2270/328; F05B 2270/331; F05B 2270/335; G06N 3/08; G06N 3/047; G06N 20/00; Y02E 10/72
See application file for complete search history.

(56) References Cited

U.S. PATENT DOCUMENTS

| | | | | |
|---|---|---|---|---|
| 2019/0018403 | A1 | 1/2019 | Ueki | |
| 2020/0056589 | A1* | 2/2020 | Evans | F03D 7/048 |
| 2021/0123416 | A1* | 4/2021 | Vestergaard | F03D 7/0292 |

FOREIGN PATENT DOCUMENTS

| | | | | |
|---|---|---|---|---|
| DE | 102014118146 A1 | 6/2015 | | |
| DE | 102019111307 A1 | 11/2019 | | |
| DE | 102018214099 A1 | 2/2020 | | |
| EP | 2736003 A1 | 5/2014 | | |
| EP | 3260700 A1 | 12/2017 | | |
| EP | 3605404 * | 2/2020 | | G06N 3/08 |
| EP | 3608538 A1 | 2/2020 | | |
| WO | WO 2020200421 A1 | 10/2020 | | |

OTHER PUBLICATIONS

Friedman, Jerome H.: Multivariate Adaptive Regression Splines. In: Annals of Statistics 19(1): 1-67 (Mar. 1991). DOI: 10.1214/aos/1176347963. https://doi.org/10.1214/aos/1176347963.

Guyon, Isabelle [u.a.]: Gene Selection for Cancer Classification using Support Vector Machines. In: Machine Learning, vol. 46, 2002, No. 1-3. S. 389-422.—ISSN 0885-6125 (P); 1573-0565 (E). DOI: 10.1023/A: 1012487302797. https://link.springer.com/article/10.1023/A:1012487302797.

Norm ASTM E1049-85 1985-06-00. Standard Practices for Cycle Counting in Fatigue Analysis. S. 778-786. DOI: 1031520/E1049-85R17.

Norm DIN EN 61400-13, VDE 0127-13 2017-06-01. Windenergieanlagen—Teil 13: Messung von mechanischen Lasten (IEC 61400-13:2015); Deutsche Fassung EN 61400-13:2016. S. 1-112. Bibliographieinformationen ermittelt über: http://perinorm/perinorm/docum ent.aspx [abgerufen am Nov. 27, 2017].

Park, Trevor; Casella George: The Bayesian Lasso. In: Journal of the American Statistical Association, Bd. 103, 2008, H. 482, S. 681-686.—ISSN 0003-1291 (p); 1537-274X (e). DOI 10.1198/016214508000000337; https://people.eecs.berkeley.edu/~jordan/courses/260-spring09/other-readings/park-casella.pdf.

* cited by examiner

METHOD FOR TRAINING A MACHINE LEARNING MODEL USABLE FOR DETERMINING A REMAINING USEFUL LIFE OF A WIND TURBINE

CROSS-REFERENCE TO RELATED PATENT APPLICATIONS

This patent application is a continuation of International Application No. PCT/EP2022/061701, filed on May 2, 2022, which claims the benefit of priority to German Patent Application No. 10 2021 113 547.8, filed May 26, 2021, the entire teachings and disclosures of both applications are incorporated herein by reference thereto.

FIELD OF THE DISCLOSURE

The application relates to a method for training a machine learning model, in particular usable for determining, in particular estimating, a turbine condition of at least one component of a wind turbine, particularly preferably usable for determining, in particular estimating, a remaining useful life of the wind turbine. The application further relates to a method for using a machine learning model and a computing device.

BACKGROUND OF THE INVENTION

Electrical energy is increasingly generated using renewable energy sources. Thus, (onshore and/or offshore) wind farms with at least one wind turbine are installed. A wind turbine is configured to convert wind energy, i.e., kinetic energy of moving air, into electrical energy.

Generally, a wind turbine comprises a tower and a nacelle arranged on the tower. By means of a rotor, a generator and the like, the wind energy is converted into electrical energy.

A wind turbine is exposed to high (mechanical) loads after the installation and during the operation of the wind turbine. These lead to a finite technical lifetime of any wind turbine. The main reason for this is fatigue on certain (non-repairable and non-replaceable, respectively) components of a wind turbine. These components are also referred to as supporting structural components (e.g., tower, nacelle, foundation, etc.).

In practice, such structural components cannot, in particular, be replaced or repaired by spare parts. This means in particular that a replacement/repair of such a component compared to a new installation is not carried out in practice for cost reasons, even if it would be theoretically possible.

In principle, the aim is to operate a wind turbine until the end of the actual technical service life of the wind turbine is reached, if possible. The end of the technical service life is in particular the end of the safe operating time of a wind turbine. The actual service life means, in particular, the point in time at which the actual turbine condition of the wind turbine reaches or falls below respectively exceeds at least a certain turbine condition limit value. The certain turbine condition limit value may be predetermined. In particular, the certain turbine condition limit value may indicate a condition of the wind turbine (in particular, of one of the structural components of the wind turbine) above which the risk of a damage (in particular, a fatigue damage) to one of the non-repairable and non-replaceable components, respectively, of the wind turbine is no longer acceptable.

In other words, an operating of a wind turbine may no longer be permissible when the at least one specified turbine condition limit is reached.

Therefore, with the constantly growing number of wind turbines and wind farms, respectively, there is a fundamental need to determine, i.e., in particular to predict, the technical service life, also referred to as "Remaining Useful Life" (RUL), of a wind turbine in operation with as high a degree of accuracy as possible. The RUL of wind turbines is an important characteristic number in the evaluation of a wind farm.

The RUL can be determined by the fatigue damage introduced into the structure of the wind turbine, i.e., the at least one structural component of the wind turbine, up to the time of assessment (cf. instantaneous turbine condition) compared to the allowable damage (for example, defined by the at least one turbine condition limit value of the at least one structural component).

It shall be understood that the allowable damages may include appropriate safety factors. In other words, the actual turbine condition of the at least one structural component may be determined in comparison to an allowable turbine condition, i.e., compared to at least one specific turbine condition limit value.

It is known from the prior art to calculate the damage of a wind turbine from the wind turbine loads and stresses, respectively, based on a suitable damage model for the wind turbine by a computing device. In particular, a model can be used for each component and structural component, respectively, under consideration. Therefore, the most accurate approach would be to continuously measure the component loads on all wind turbines throughout the lifetime of each wind turbine and then a prediction using the damage model. Due to the enormous costs associated with this approach of taking such measurements at each wind turbine over a period of at least three months, preferably at least six months, this approach is simply not feasible in practice.

Therefore, in the prior art, simulation models are used to estimate the RUL of a wind turbine. For example, in the prior art, so-called aero-elastic simulation models are used to estimate the component loads and component stresses, respectively, of a wind turbine. In particular, one simulation model is used to represent a specific type of turbine. However, this mapping is associated with a high effort. The simulation models are then calibrated and validated with available operational data of a wind turbine, such as power curve, thrust curve, foundation loads under design conditions, etc.

Load measurement and stress measurements, respectively, during an operation of a wind turbine are usually not performed. Therefore, the uncertainty of such a simulation model is usually very high. According to the high uncertainty, correspondingly high safety factors are considered, resulting in very conservative RUL results. However, with the prior art, the high uncertainty and the already high effort can only be improved by using considerable resources.

One way to reduce the uncertainty at least somewhat, which is rarely used in practice, is based on an estimation of the loads acting on a wind turbine using wind turbine operating data, in particular in the form of SCADA (Supervisory Control and Data Acquisition) operating data of the wind turbine.

A problem with an estimation process of a damage accumulation based on the derivation of loads from SCADA operating data is that it is non-linear to a high degree. With the known simulation models, this problem regularly leads to very unreliable results.

In summary, it can be stated that the estimation of a remaining useful life of a wind turbine in the prior art is very complex and at the same time has a high uncertainty.

SUMMARY OF THE INVENTION

Therefore, an object of the application is to provide a possibility to determine a remaining useful life of a wind turbine, which allows a more reliable determination of the remaining useful life with, in particular a lower effort.

The object is solved according to a first aspect of the application by a method according to the present disclosure, in particular a computer-implemented method, for training a machine learning model, wherein the machine learning model is for example (indirectly) usable for determining a remaining useful life of a wind turbine. The method comprises:

providing a plurality of (time-dependent) operation data sets of a reference wind turbine, providing a plurality of (time-dependent) load data sets of the reference wind turbine, wherein a load data set is based on at least one load parameter measured at the reference wind turbine, and generating a plurality of wind turbine training data sets for training a machine learning model by a synchronized assigning of a respective operation data set to a respective load data set.

According to a further aspect of the application, the object is solved by a method according to the present disclosure for using a machine learning model trained according to the described method. The method comprises:

inputting, by the (trained) machine learning model, at least one operation data set of a further wind turbine; and outputting, by the (trained) machine learning model, at least one turbine condition data set.

In particular, the method is used to determine the instantaneous and, in particular, actual (structural and mechanical) turbine condition of at least one structural component of the further wind turbine. Based on this (at least one) turbine condition, a remaining useful life of the further wind turbine can then in particular be determined, in particular predicted with an increased accuracy.

In contrast to the prior art, according to the application a possibility is provided for determining an instantaneous turbine condition of a wind turbine, and based thereon a remaining useful life of the wind turbine, which enables a more reliable determination of the remaining useful life with, in particular, less effort, in that a machine learning model is trained with training data sets which each contain synchronized operating data and load data of a reference wind turbine, and in that the trained machine learning model can then be used for determining the turbine condition of a further wind turbine. Based on this determined turbine condition, the remaining useful life of the further wind turbine can then in turn be determined (for example, in a conventional manner).

According to the application, a method for training a machine learning model is provided. In other words, a machine learning model can be trained by the method according to the application. The trained machine learning model can subsequently be used, in particular indirectly, for determining a remaining useful life of a wind turbine.

The machine learning model may preferably be and/or comprise an artificial neural network.

An artificial neural network comprises artificial neurons. In particular, such a neuron is configured to receive at least one input each from at least two further artificial neurons. The at least two inputs may each be received by means of at least one connection with a certain (trainable) weighting.

An artificial neuron may further be configured to integrate the at least one input into at least one output, for example, by the neuron summing at least two received inputs and, for example, applying a function, such as a sigmoid transform, to the sum in order to generate an output. The output of an artificial neuron, in particular multiplied by a connection weight of a further connection to a further neuron, may form an input to that further neuron.

According to the application, a plurality of operation data sets of said at least one reference wind turbine and a plurality of (mechanical and/or structural) load data sets of said at least one reference wind turbine are provided.

As has been described, an instantaneous turbine condition of a structural component can be determined, in particular estimated, from load parameters and the load parameter values, respectively, measured at a wind turbine during a measurement period. In contrast, a determination of the instantaneous turbine condition based solely on the operating data (preferably SCADA operating data) detected during a detection time period is not possible according to the prior art.

According to the application, it has been recognized that, in principle, there is a relationship between the load parameter values and the operating data values. In particular, it has been recognized that by means of special training data sets, which contain both load parameter values and operating data values of a (reference) wind turbine, a machine learning model can be trained in such a way that this correlation and theses correlations, respectively, can be detected and mapped in the machine learning model. In particular, patterns between load parameter values and operational data values can be detected by a machine learning model. These can be mapped in the machine learning model.

Through this, it is subsequently possible to determine, in particular to estimate, the remaining useful life of a further wind turbine (at least indirectly) using (exclusively) the operating data of this further wind turbine. Thus, at least one operation data set, preferably a plurality of operation data sets, of a further wind power turbine can be input into the machine learning model, i.e., in particular made available as input(s). As output, at least one turbine condition data set can be provided by the machine learning model, which can already contain an (estimated) remaining useful life or at least at least one turbine condition indicator (e.g., at least one fatigue load indicator) from which the remaining useful life can be determined, in particular can be estimated in a conventional manner.

As has already been described, a plurality of operation data sets and a plurality of load data sets of a reference wind turbine are provided for forming a plurality of training data sets. A reference wind turbine means in particular an operating wind turbine, in particular of a wind farm, whose operation parameter values and load parameter values are detected to form training data sets. A reference wind turbine can be selected in any way from a plurality of wind turbines of a wind farm.

An operation data set contains at least one operation parameter value of the reference wind turbine. Preferably, an operation data set contains a plurality of these operation parameters (values). In particular, an operation parameter means an operation parameter of the wind turbine detected during the operation of the wind turbine (for the operation of the wind turbine) and relating to the operation of the wind turbine. Preferably, a provided operation data set of the reference wind turbine is a SCADA operation data set of the reference wind turbine respectively an operation data set of the reference wind turbine comprising at least one SCADA operation parameter of the reference wind turbine.

A load data set, in particular in the form of a fatigue load data set, contains at least one structural and/or mechanical load parameter and load parameter value, respectively, of a (previously described) structural component of the reference wind turbine.

In particular, during the operation of a reference wind turbine, load parameter values of at least one load parameter of the reference wind turbine and operation parameter values of at least one operation parameter of the reference wind turbine are simultaneously detected.

A plurality of time-dependent operation data sets may then be formed from the detected operation parameter values of the at least one operation parameter, in particular in a conventional manner. In particular, each operation data set may be assigned with an operation data time period (e.g., a time stamp) that relates to the measurement period of the measurement and detection, respectively, of the at least one operation parameter. For example, an operation data time period may comprise a start time point (formed in particular by date and time (e.g., 1.1.21, 1:00 a.m.)), a time length (preferably between 5 and 30 min, in particular (in a conventional manner) 10 min), and an end time point (formed in particular by date and time (e.g., 1.1.21, 1:10 a.m.)).

A plurality of time-dependent load data sets can then be formed from the detected load parameter values of the at least one load parameter. In particular, in order to enable a (temporally) synchronized assigning of operation data sets to load data sets, the forming of load data sets can preferably be oriented to respectively correspond to the forming of the operation data sets (for example, specified by a SCADA system anyway).

In particular, each load data set can be assigned with a load data time period (e.g., a time stamp) that relates to the measurement period of the measurement respectively detection of the at least one load parameter. This load data time period may be selected to correspond to the operation data time period. For example, a load data time period may comprise a start time point (formed in particular by date and time (e.g., 1.1.21, 1:00 am)), a time length (preferably between 5 and 30 min, in particular (in a conventional manner) 10 min), and an end time point (formed in particular by date and time (e.g., 1.1.21, 1:10 am)).

For generating wind power training data sets, according to the application, a synchronous respectively synchronized assigning of load data sets to operation data sets is performed, in particular depending on the respective assigned load data time period and the operation data time period, respectively. In other words, in particular a temporally synchronous respectively temporally synchronized assigning of temporally synchronous data sets, i.e., data sets with the same time dependency (e.g., the same time stamp), to each other can be performed.

For example, an operation data set with start time point $t_{A1}$ (e.g., 1.1.21, 1:00 a.m.), a time length $T_{L1}$ (e.g., 10 min), and an end time point $t_{E1}$ (e.g., 1.1. 21, 1:10 am), is assigned to a load data set with a corresponding start time point $t_{A1}$ (e.g., 1.1.21, 1:00 am), a corresponding time length $T_{L1}$ (e.g., 10 min) and a corresponding end time point $t_{E1}$ (e.g., 1.1.21, 1:10 am).

By the synchronous assignment according to the application, in particular a wind power training data set is formed, which (always) contains respectively is formed from (exactly) one load data set (respectively the corresponding parameter values) and (exactly) one operation data set (respectively the corresponding parameter values).

According to one embodiment of the method according to the application, the machine learning model may be trained (in a conventional manner) with the generated wind power training data sets during a training time period. In other words, the generated wind power training data sets are provided in order to the machine learning model, in particular, to be learned.

According to a further embodiment of the method according to the application, a part (for example between 10% and 30%, preferably between 15% and 25%) of the generated wind power training data sets may be used as validation data sets during a training time period. In particular, the training success of a machine learning model can be checked, i.e., in particular validated, by means of validation data sets. Preferably, the validation data sets can be randomly selected from the generated wind power training data sets.

According to a preferred embodiment of the method according to the application, a provided operation data set may contain at least one operation parameter (and a detected operation parameter value, respectively) of the reference wind power turbine. The at least one operation parameter may be selected from the group comprising:

- tower top acceleration,
- pitch angle,
- pitch speed (i.e., in particular, the speed at which the blade is pitched),
- rotor speed,
- electrical power, in particular active electrical power,
- nacelle wind speed(s).

The operation data set may comprise only one of the aforementioned operation parameters, preferably two of the aforementioned operation parameters, particularly preferably all of these operation parameters. It shall be understood that additional operation parameters not explicitly mentioned herein may also be provided alternatively or additionally, if necessary. In particular, at least one sensor module, in particular a plurality of (different) sensor modules, may be provided to measure (preferably continuously) the at least one operation parameter and/or its operation parameter values. The measured operation parameter values and/or signals of an operation parameter can then be provided, for example by a SCADA control module.

Preferably, an operation data set comprises an operation data time period as previously described.

According to a further embodiment of the method according to the application, an operation data set may comprise, as an operation parameter value of an operation parameter, at least one operation parameter value selected from the group comprising:

- maximum operation parameter value detected during (the time length of) the operation data time period of the operation data set,
- minimum operation parameter value detected during (the time length of) the operation data time period of the operation data set,
- operation parameter mean value determined from the operation parameter values detected during (the time length) of the operation data time period of the operation data set,
- standard deviation determined from the operation parameter values detected during (the time length of) the operation data time period of the operation data set.

An operation data set can comprise two of the said operation parameter values for the at least one operation parameter, preferably all of these operation parameter values. This allows higher quality training data sets to be formed.

A preferred example of an operation data set according to the present application is given in Table 1.

TABLE 1

| Operation Parameter | Operation Parameter Value |
|---|---|
| tower top acceleration | max. acceleration value |
| | min. acceleration value |
| | mean acceleration value |
| | standard deviation of acceleration values |
| pitch angle | max. angle value |
| | min. angle value |
| | mean angle value |
| | standard deviation of angle values |
| rotor speed | max. speed value |
| | min. speed value |
| | mean speed value |
| | standard deviation of the speed values |
| electrical power, in particular active electrical power | max. power value |
| | min. power value |
| | mean power value |
| | standard deviation of the power values |
| nacelle wind speed | max. speed value |
| | min. speed value |
| | mean speed value |
| | standard deviation of the velocity values |

The preferred operation parameters described above refer in particular to onshore wind turbines.

According to the application, it has been recognized that in the case of an offshore wind turbine, an operation data set should comprise at least one further (offshore-related) operation parameter respectively a further operation data set should be provided with at least one further (offshore-related) operation parameter. In particular, it has been recognized according to the application that, in the case of an offshore wind turbine, an operation data set (or a further offshore operation data set that can be additionally assigned according to the described synchronous assignment) can contain at least one water body condition parameter. A water body condition parameter means, in particular, a parameter indicating the condition of the water body (in particular a sea) surrounding the offshore wind turbine.

The at least one water body condition parameter is preferably a hydrodynamic parameter. The at least one water body condition parameter may be a wave parameter (e.g., wave height, wave direction, and/or wave frequency) and/or a flow parameter (e.g., flow velocity and/or flow direction).

An example of an (offshore) operation data set according to the present application with offshore related operation parameters is given in Table 2.

TABLE 2

| Operation Parameter | Operation Parameter Value |
|---|---|
| wave height | max. height value |
| | min. height value |
| | mean height value |
| | Standard deviation of height values |
| wave frequency | max. frequency value |
| | min. frequency value |
| | mean frequency value |
| | standard deviation of frequency value |
| flow velocity and/or wave velocity | max. velocity value |
| | min. velocity value |
| | mean velocity value |
| | standard deviation of velocity values |

It shall be understood that Table 1 and Table 2 can be combined with each other.

According to a further preferred embodiment of the method according to the application, a pre-processing of the provided operation parameter values and/or load parameter values and/or wind power training data parameter values may be performed. In particular, the quality of the training data sets can be improved if the quality of said values is improved (e.g., erroneous values due to measurement errors are identified in advance and then, in particular, remain unremarkable or are replaced by more suitable values by suitable means).

Pre-processing may in particular comprise at least one of the following measures:

removing of invalid operation parameter values and/or load parameter value and/or wind power training data parameter values (and corresponding outliers, respectively). This is preferably performed by using direct wind turbine condition indicators (wind turbine condition signal in SCADA, if available) and/or indirectly by using the power signal in SCADA in conjunction with the power curve specification.

extracting from an appropriate set of features/parameter values by considering a collinearity of the features/parameter values. This can be performed by calculating the correlations of the parameters with each other and comparing them to an allowable upper limit.

alternatively, all features/parameter values (except the highly collinear ones) can be retained and a machine learning method with implicit feature selection can be used (e.g., Bayesian LASSO (see, e.g., Trevor Park & George Casella (2008), The Bayesian Lasso, Journal of the American Statistical Association) or MARS). This can be performed, for example, by using a regression technique, such as a multivariate regression (see, e.g., Friedman, J. H. (1991) "Multivariate Adaptive Regression Splines").

scaling of the operation parameter values and/or load parameter value and/or wind power training data parameter values, e.g., standardization of the operation parameter values with zero expected value (zero mean) and e.g., constant variance (usually equal to 1).

Other transformations are also conceivable. In particular, the goal is always that the variables are approximately standard-normally distributed after the transformation.

According to a further preferred embodiment of the method according to the application, a provided load data set can be based on at least one measured load parameter of the reference wind turbine. Based means in particular that the load data set does not directly comprise the (measured) load parameter values of the at least one load parameter, but rather fatigue load indicators respectively indicator values derived respectively determined therefrom.

The at least one load parameter may preferably be selected from the group comprising:

blade root load parameter (also referred to as blade root load), rotor load parameter (also referred to as rotor load), tower load parameter (also referred to as tower load), tower torsion parameters (also referred to as tower torsion), tower top moment parameters (also referred to as tower top moment).

The load data set may be based on only one of the aforementioned load parameters. The load data set may be based on two of the aforementioned load parameters, preferably all of these load parameters.

In particular, the at least one blade root load parameter may be a blade bending parameter (also referred to as flap bending) and/or an edge bending parameter (also referred to as edge bending). In addition, the at least one rotor load parameter may be a tilt moment parameter (also referred to as tilt moment), a yaw moment parameter (also referred to as yaw moment), and/or a rotor torque parameter (also referred to as rotor torque). The at least one tower load parameter may be a tower base bending parameter (in two directions). The at least one tower top moment parameter may be a tilt moment parameter (also referred to as tilt moment), yaw moment parameter (also referred to as yaw moment), and/or a roll moment parameter (also referred to as roll moment).

A turbine condition and a component condition, respectively, of a specific component, in particular a structural component, of the wind turbine can be determined from said load parameters.

The load parameter values of a load parameter can be (continuously) measured and, in particular, provided by at least one load sensor of a sensor arrangement. In particular, a measuring of the at least one load sensor can be performed with a high resolution (e.g., 20 Hz). An intermediate storage of the measured values for further processing is possible. For this purpose, the at least one load sensor can be arranged at a suitable position in respectively at the wind turbine.

According to a particularly preferred embodiment of the method according to the application, the method may further comprise:

measuring the at least one load parameter of the reference wind turbine, wherein the measuring of the at least one load parameter is performed in particular according to the standard IEC 61400-13 [2].

In particular, at least the (key) load parameters mentioned in section 3.3.2 of the standard IEC 61400-13 [2] may be measured, in particular according to said standard.

According to a further embodiment of the method according to the application, the load parameter value of a load parameter may be a load parameter value selected from the group comprising:

maximum load parameter value measured during (the time length of) the load data time period, minimum load parameter value measured during (the time length of) the load data time period, load parameter mean value determined from the load parameter values measured during (the time length) of the load data time period, standard deviation determined from the load parameter values measured during (the time length) of the load data time period.

A load data set can be based on at least two of the mentioned load parameter values, preferably on all of these load parameter values. This allows higher quality training data sets to be formed.

A preferred example of load parameters and load parameter values on which a load data set can be based is given in particular in Table 3.

TABLE 3

| Load Parameter | Load Parameter Value |
|---|---|
| blade bending parameter | max. bending value |
| | min. bending value |
| | mean bending value |
| | standard deviation of bending values |
| edge bending parameter | max. bending value |
| | min. bending value |
| | mean bending value |
| | standard deviation of bending values |
| rotor tilt moment parameter | max. moment value |
| | min. moment value |
| | mean moment value |
| | standard deviation of moment values |

According to a further embodiment of the method according to the application, the method may further comprise:

measuring the at least one load parameter of the reference wind turbine during a measurement time period, and detecting of operation data of the reference wind turbine during the measurement time period, wherein the measurement time period is in particular at least 3 months, preferably at least 6 months (and e.g., at most 36 months).

Each measured (digital) load parameter value can be assigned a time stamp of the measurement time point. This can be taken into account (at least indirectly) for forming a load data set and, in particular, for the synchronized assignment described above.

During a measurement period, the at least one operation parameter can be continuously detected and, in particular, measured in each case. For example, an intermediate storage of the measured data can be performed.

As has already been described, corresponding data sets can be formed and then provided in order to be able to generate, in particular, a plurality of wind power training data sets for training a machine learning model. In order to obtain a sufficient number of training data sets (in particular under an assumed time length of 10 min for each operation data set (and load data set), the measurement time period can be at least 3 months, preferably at least 6 months.

For example, approximately 100,000 wind power training data sets can be generated. Preferably, of these, about 20,000 wind power training data sets can be used as validation data sets.

According to a further embodiment of the method according to the application, the method may further comprise:

forming a (time-dependent) load data set by converting the at least one measured load parameter value of the reference wind turbine into at least one fatigue load indicator, wherein the converting is based in particular on a Rainflow Counting method.

As previously described, a load data set may be based on at least one measured load parameter value of at least one load parameter of the reference wind turbine. In particular, a load data set may be based on at least one converted load parameter value, i.e., may in particular contain the at least one fatigue load indicator.

Particularly preferably, a converting of the at least one measured load parameter value of the reference wind turbine into at least one fatigue load indicator may be performed according to the ASTM E1049-85 (2017) standard.

According to the application, in order to obtain a high-quality machine learning model, it has been recognized that a so-called overfitting should be avoided during the training process. In particular, this means that during the training process it is ensured that the machine learning model only recognizes patterns in the training data that are actually present and have not occurred randomly (once).

Therefore, according to a further preferred embodiment of the method according to the application, the application proposes that at least one regularization technique is applied during the training time period. This can at least reduce the risk of overfitting.

The at least one regularization technique may in particular be selected from the group comprising:

linear Bayesian regression (also referred to as Bayesian linear regression),

Bayesian neural network by concrete dropout, or Bayesian by Variational Inference, adaptive Bayesian spline regression.

Such regularization techniques have been shown to be particularly advantageous.

According to a further embodiment of the method according to the application, a model for estimating the aleatory and/or epistemic uncertainties may be applied during the training time period.

Further, during the training process, for example, a so-called loss function may be used to evaluate the machine learning model based at least in part on the output. For example, a loss function may contain a metric of comparing the output to a reference variable. For example, a loss function may be defined when a reference output is known for a given input. For example, the loss function may be a so-called "Gaussian negative log likelihood function".

In a training step of the training process, the machine learning model may be adapted. In particular, an adapting may comprise a changing at least one parameter of the machine learning model.

A wind power training data set may preferably be in the form of text data, from which a suitable presentation and representation, respectively, may be generated. For example, the generated presentation may be formed from a vector, a matrix, and/or a tensor.

As has already been described, the trained machine learning model can be used to determine the turbine condition of a further wind turbine, in particular to estimate it with a high degree of accuracy.

For example, a machine learning model may be any algorithm that receives an input (in the present case, in particular, at least one operation data set, preferably a plurality of historical and stored operation data sets of a further wind turbine) and returns an output (in the present case, in particular, at least one turbine condition data set, preferably containing at least one fatigue load indicator of at least one component of the further wind turbine), wherein the output is dependent on both the input and at least one parameter of the machine learning model.

As has been described, the machine learning model is previously trained to learn a relationship between inputs and outputs. The trained machine learning model can then be used to generate a new output from a new input.

In particular, the input for the trained machine learning model in the present case are operation data sets, which can preferably be transformed into a vector, a matrix and/or a tensor for an input.

According to a further embodiment of the method according to the application, the further wind turbine may be a wind turbine type identical to the wind turbine type of the reference wind turbine. In other words, if the reference wind turbine is of type V1, then the trained machine learning model can preferably be used to determine, in particular to estimate, the turbine condition and in particular the RUL of further wind turbines of the same or similar type (i.e., type V.x). It shall be understood that the machine learning model trained according to the application can still provide acceptable results even for similar types (for example with an upgrade).

Alternatively or additionally, the further wind turbine and the reference wind turbine may be comprised by the same wind farm. A wind farm may comprise a plurality of wind turbines. In order to determine the turbine condition and in particular the RUL of preferably all wind turbines of a wind farm, at least one wind turbine of the wind farm (in variants of the application, more, for example two, may be selected) may be selected as a reference wind turbine. After training a machine learning model as previously described, the turbine condition and in particular the RUL of at least one further wind turbine, preferably all further wind turbines, of the wind farm can be determined using the trained machine learning model.

According to a preferred embodiment of the method according to the application, the method may further comprise:

determining the remaining runtime of the further wind turbine, based on the at least one turbine condition data set of the further wind turbine.

As has been described, the remaining runtime and RUL, respectively, of the further wind turbine can be estimated from the output turbine condition data set with a high degree of accuracy (in particular, using already known estimation methods).

For some parts and structural components, respectively, of a wind turbine, such as steel tube towers, the damage (and hence the RUL) can be estimated from structural models of the tower shell and the welding seams (and the turbine condition data set). For example, weld details, tower geometry (e.g., thicknesses, diameters), and material properties may be known or (conservatively) estimated for this purpose.

However, for structural components, such as rotor blades, machine frames, generator base plate, and/or hub, this would require a significant effort to determine material grades and geometries, create FEM models, and calculate fatigue strength. Such an approach is only useful if more detailed information can be obtained from the turbine manufacturer or if the number of turbines of the type under consideration is large enough.

Alternatively, it might be an option to try to obtain reference/design loads. For the tower base, such loads can be found in publicly available foundation load data; for other components, working with the OEM might be unavoidable.

A variation of the further option could be to select wind conditions from the measurements that are close to the turbine design conditions, and take the reference loads from the measurements themselves and extrapolate them to 20 years.

A still further aspect of the application is a computing device comprising at least one data memory containing computer program code, and at least one processor, wherein the program code and the processor are configured such that the computing device is caused to generate at least one turbine condition data set based on at least one provided operation data set and at least in part by using a machine learning model trained according to the present disclosure.

The machine learning model may in particular be stored in the data memory.

A previously described module, element, etc., may comprise at least in part hardware elements (e.g., processor, memory means, etc.) and/or at least in part software elements (e.g., executable code).

The features of the methods and computing devices may be freely combined with each other. In particular, features of the description and/or of the dependent claims may be independently inventive, even by completely or partially bypassing features of the independent claims, either alone or freely combined with each other.

BRIEF DESCRIPTION OF T DRAWINGS

There is now a multitude of possibilities for designing and further developing the method according to the application for training a machine learning model usable for determining a remaining useful life of a wind turbine, the method according to the application for using a trained machine learning model and the computing device according to the application. For this purpose, reference is made on the one hand to the patent claims subordinate to the independent patent claims, and on the other hand to the description of embodiments in connection with the drawing. The drawing shows:

DETAILED DESCRIPTION

Figure 1:
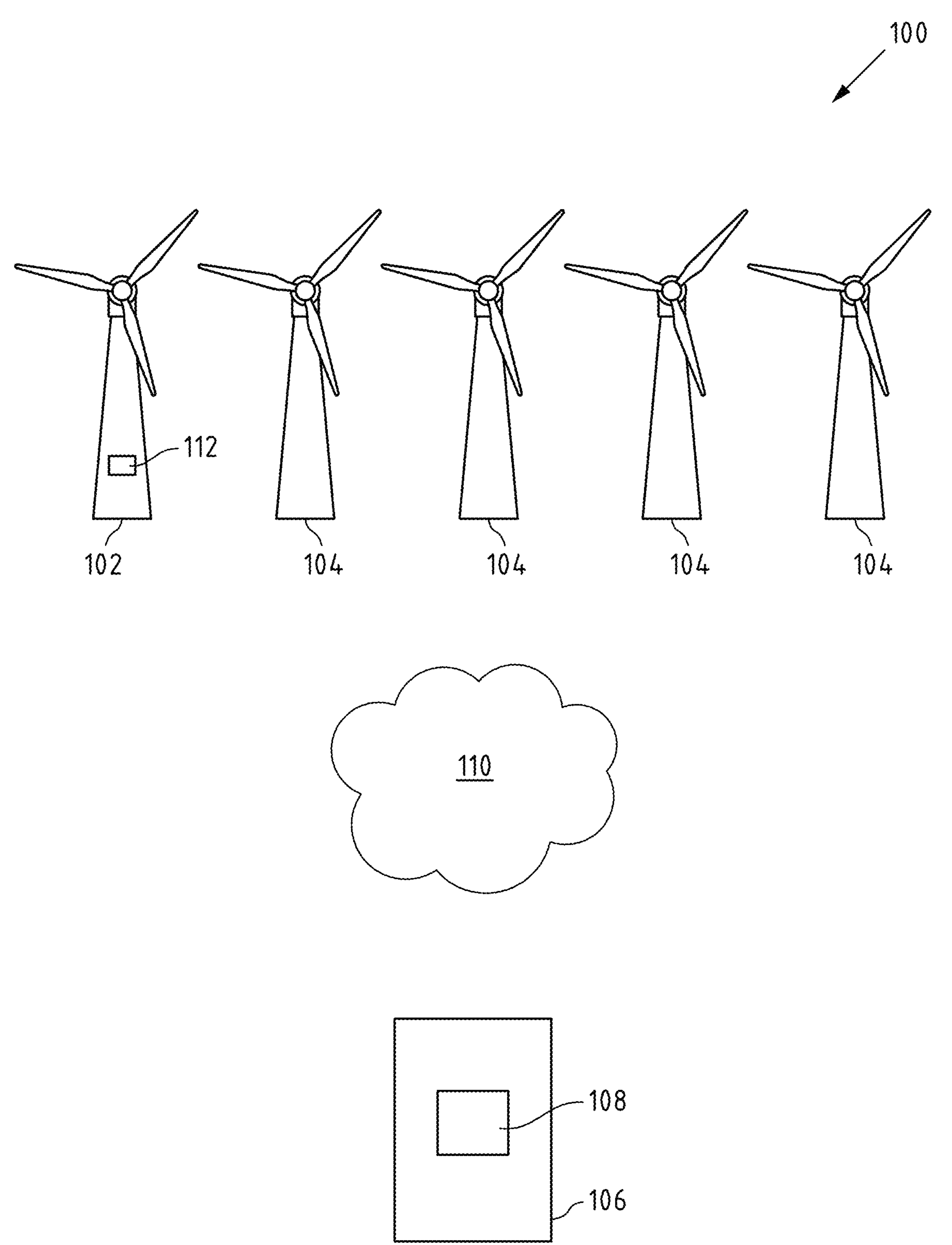
FIG. 1 is a schematic view of an example of a wind farm with a plurality of wind turbines.

FIG. 1 shows a schematic view of an example of a wind farm 100 comprising a plurality of wind turbines 102, 104. Hereby, the reference sign 102 denotes the (selected) reference wind turbine and the reference sign 104 denotes the further wind turbines of the wind farm 100. The wind farm 100 may be an onshore wind farm and/or an offshore wind farm.

The wind farm 100 may preferably comprise a (central) control device 106, in particular comprising at least one control module 108, for example a SCADA control module 108.

In particular, the operation parameter values of at least one operation parameter of at least one wind turbine 102, 104, preferably all wind turbines, of the wind farm 100 may be detected and transmitted, for example, via a (wireless and/or wired) communication network 110 to the (central) control device 106. Preferred operation parameters are, for example, the parameters mentioned in Table 1.

Preferably, the at least one control module 108 may control and/or regulate the wind farm in a conventional manner based at least also on the received (SCADA) operation data sets of the wind turbines 102, 104.

Further, the operation data sets may be recorded and stored, respectively (in a data memory not shown (e.g., of the control device 106)). This may be provided for documentation purposes anyway. Preferably, the operation data sets of the wind turbines 102, 104 may be stored and used to determine a respective turbine condition of the respective wind turbine 102, 104 (as will be described).

As can be further seen, the reference wind turbine 102 comprises a sensor arrangement 112 having at least one load sensor (in particular, a plurality of load sensors). The at least one load sensor is configured to measure at least one load parameter (e.g., blade root load parameter, rotor load parameter, tower load parameter, tower torsion parameter, and/or tower top moment parameter).

Preferably, the measured load parameter values of the at least one load parameter may be stored in a data memory (not shown) (e.g., of the control device 106) for a subsequent further processing, as will be described.

Preferably, the wind turbines 102, 104 of the wind farm 100 may be of the same wind turbine type.

Figure 2:
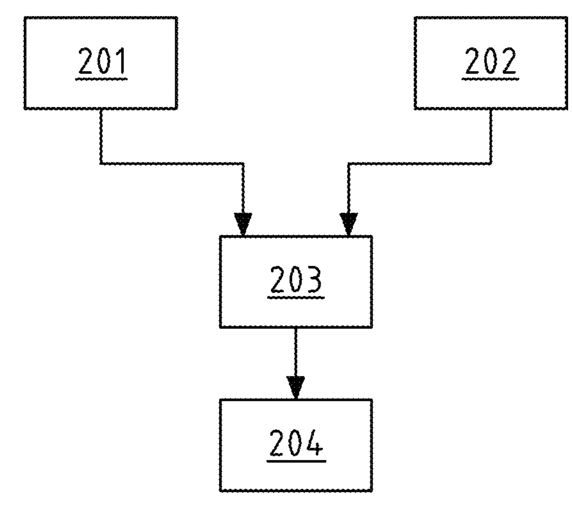
FIG. 2 is a diagram of an embodiment of a method according to the present application.

FIG. 2 shows a diagram of an embodiment of a method according to the present application. In particular, the method is a computer-implemented method for training a machine learning model. The machine learning model is usable for indirectly determining a remaining useful life of a wind turbine, in particular for determining the structural and/or mechanical turbine condition of the wind turbine.

In a step 201, a providing of a plurality of operation data sets of a reference wind turbine is performed. An operation data set is in particular a SCADA operation data set. In the case of an onshore wind turbine, the operation data set may be formed, by way of example according to Table 1. It shall be understood that other, further or fewer operation parameters and/or operation parameter values may be contained. In the case of an offshore wind turbine, the operation data set may be formed, by way of example according to Tables 1 and 2. In particular, this comprises that an operation data set may be formed from two separate sub-operation data sets. It shall be also understood here that other, further or fewer operation parameters and/or operation parameter values may be contained.

In particular, each operation data set may be assigned with an operation data time period relating to the measurement period of the measurement of the at least one operation parameter. For example, an operation data time period may comprise a start time point (e.g., 1.1.21, 1:00 am), a time length (e.g., 10 min), and an end time point (e.g., 1.1.21, 1:10 am).

In particular, the plurality of operation data sets may be provided for the entire detection time period and measurement time period, respectively.

In step 202, a providing of a plurality of load data sets of the reference wind turbine is performed, wherein a load data set is based on at least one load parameter measured at the reference wind turbine.

Each load data set may in particular be assigned with a load data time period relating to the measurement period of the measurement of the at least one load parameter. This load data time period may be selected to correspond to the operation data time period.

For example, a load data time period may comprise a start time point (e.g., 1.1.21, 1:00 am), a time length (e.g., 10 min), and an end time point (e.g., 1.1.21, 1:10 am). In other variants (in particular if the time length is always fixed), an operation data time period and/or a load data time period may also be sufficiently determined by a single time stamp.

In a further step 203, a generating of a plurality of wind power training data sets for training a machine learning model is performed. The generating is performed by synchronized assigning of a respective operation data set to a respective load data set.

The (temporally) synchronized assigning of an operation data set to a load data set is performed in particular depending on the respective assigned load data time periods respectively operation data time periods. In particular, the start time point and/or the end time point can be evaluated for this purpose. If, for example, as in the above example, the start time point (e.g., 1.1.21, 1:00 a.m.) and/or the end time point (e.g., 1.1.21, 1:10 a.m.) of an operation data set and a load data set are the same, then these operation data sets can be assigned to each other.

In particular, the assigning comprises a forming a wind power training data set containing the data of the operation data set and the assigned load data set. In other words, an operation data set may be correlated with a load data set to form a wind power training data set.

Example wind power training data sets $WTD_1$, $WTD_2$, . . . , $WTD_n$ (n is a natural number for different training data set time periods to represent different operation data time periods accordingly) are shown in Table 4. The mentioned parameter values are illustrative examples.

TABLE 4

| | $WTD_1$ | $WTD_2$ | $WTD_n$ |
|---|---|---|---|
| Blade_Load_Ind | 4.002E+03 | 4.344E+03 | 4.172E+03 |
| Blade_Load_dev_Ind | 2.444E+02 | 3.050E+02 | 1.811E+02 |
| Power_Active_Mean | 1.300E+03 | 1.465E+03 | 1.370E+03 |
| Power_Active_Min | 1.067E+03 | 1.175E+03 | 1.195E+03 |
| Power_Active_Max | 1.502E+03 | 1.757E+03 | 1.568E+03 |
| Power_Active_dev | 1.081E+02 | 1.707E+02 | 6.498E+01 |
| Rotor_Speed_Mean | 1.179E+01 | 1.223E+01 | 1.205E+01 |
| Rotor_Speed_Min | 1.117E+01 | 1.170E+01 | 1.153E+01 |
| Rotor_Speed_Max | 1.224E+01 | 1.258E+01 | 1.240E+01 |
| Rotor_Speed_dev | 3.198E−01 | 2.755E−01 | 1.818E−01 |
| . . . | . . . | . . . | . . . |

Here, Mean means the mean value, Min means the minimum value, Max means the maximum value, dev means the standard deviation and Ind means a fatigue load indicator. It shall be understood that (as indicated by . . . ) a plurality of further data may be contained.

In an (optional) step 204, a training of the machine learning model is performed using the generated wind power training data sets. Preferably, a portion of the generated wind power training data sets may be used as validation data sets. In particular, in a conventional manner, a machine learning model preferably in the form of a neural network may be trained. Here, for an input, a wind power training data set can be transformed into a vector, a matrix and/or a tensor.

Figure 3:
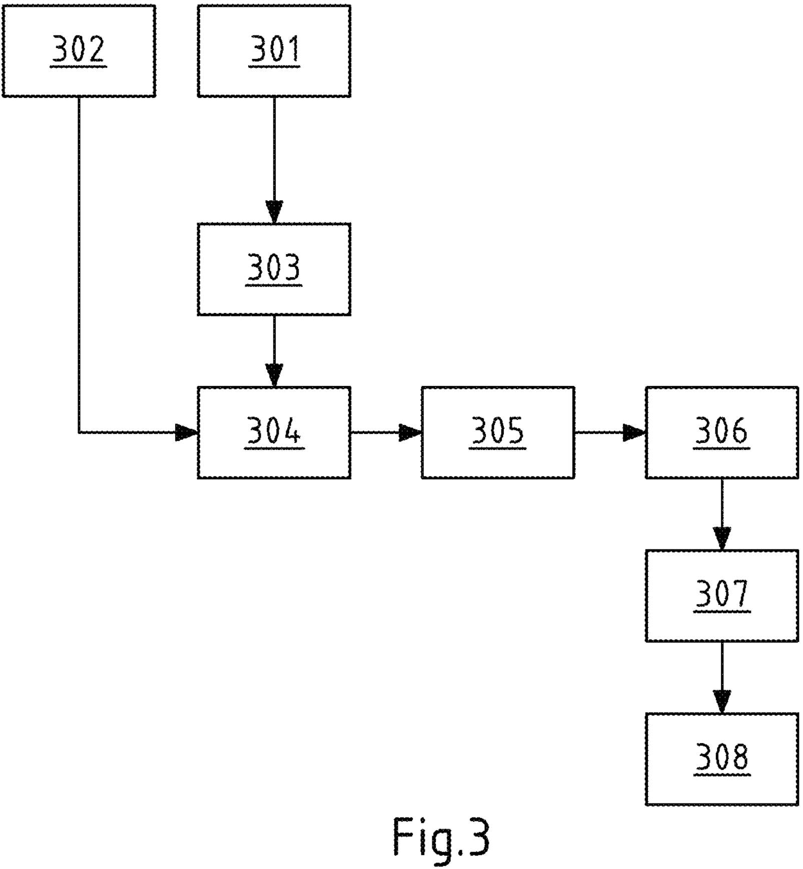
FIG. 3 is a diagram of a further embodiment of a method according to the present application.

FIG. 3 shows a diagram of a further embodiment of a method according to the present application. In order to avoid repetitions, essentially only the differences to the embodiment according to FIG. 2 are described below and otherwise reference is made to the previous explanations.

In order to provide the at least one load data set, a measuring of at least one load parameter of the reference wind turbine (i.e., of at least one component of the reference wind turbine) during a measurement period (preferably at least 6 months) may be performed in step 301.

In particular, an at least nearly continuous measurement and thus monitoring may be performed. As has already been described, the measuring of the at least one load parameter can in particular be carried out according to the IEC 61400-13 standard [2]. Preferably, the load parameter values of a plurality of load parameters of a plurality of components of the reference wind turbine can be measured.

In step 303, which may be performed at least partially in parallel with step 301, a converting of the at least one measured load parameter value of the reference wind turbine into at least one fatigue load indicator may be performed. Preferably, all load parameter values may be converted. In particular, the converting may be based on a Rainflow Counting method. Particularly preferably, converting the at least one measured load parameter value of the reference wind turbine into at least one fatigue load indicator can be performed according to the ASTM E1049-85(2017) standard.

Furthermore, in step 303, the load data sets may be formed. For this purpose, the fatigue load indicators may be subdivided (in particular, according to the time stamp with which the load parameter values (respectively the corresponding sample values) are provided) into a plurality of load data sets each having a previously described load data time period. Preferably, the load data time period may correspond to the operation data time period. In particular, an operation data time period is associated with each provided (SCADA) operation data set.

The operation parameter values of the at least one operation parameter can be detected during the measurement time period and, in particular, provided (in a known manner) in the form of operation data sets in step 302 (cf. e.g., Table 1 and/or 2).

In step 304, a generating of a plurality of wind power training data sets (cf. Table 4) for training a machine learning model is performed by synchronized assigning of a respective operation data set to a respective load data set, as described before.

In particular, in step 305, a pre-processing and pretreatment, respectively, of the generated wind power training data sets may be performed. For example, a removing of invalid values and/or indicators may be performed. Also, a feature selection in a manner previously described may be performed in step 305. Examples include sequential feature selection (e.g.: Ferri, F. J. & Pudil, Pavel & Hatef, M. (2001). Comparative Study of Techniques for Large-Scale Feature Selection. Pattern Recognition in Practice, IV: Multiple Paradigms, Comparative Studies and Hybrid Systems. 16. 10.1016/B978-0-444-81892-8.50040-7), Recursive Feature Selection (e.g., Guyon, I, J Weston, S Barnhill, and V Vapnik. 2002. "Gene Selection for Cancer Classification Using Support Vector Machines." Machine Learning 46 (1): 389-422.), Linear Regression with L1 Regulation (Lasso), and/or o Bayesian LASSO (e.g., Trevor Park & George Casella (2008) The Bayesian Lasso, Journal of the American Statistical Association, 103:482, 681-686, DOI: 10.1198/016214508000000337).

In particular, in step 306, a splitting of the generated wind power training data sets into training data sets (e.g., 80%) and validation data sets (e.g., 20%) is performed. Moreover, in particular, a transforming of the wind power training data sets into data representations is performed, which are suitable as input for the machine learning model to be trained, i.e., in particular, can depend on the machine learning model to be trained (in a known manner). Preferably, a transforming of a wind power training data set into a vector, a matrix and/or a tensor is performed.

In particular, in step 307, a training and learning, respectively, of the machine-learning model is performed during a training time period. Preferably, a neural network can be trained. Preferably, a so-called supervised training and learning, respectively, is performed using the training data sets and the validation data sets.

During the training time period, a model may be applied to estimate the aleatory and/or epistemic uncertainties, wherein the estimation may be achieved by applying at least one machine learning method. During the training time period and during the training process, respectively, at least one regularization technique may be applied. This may at least reduce the risk of overfitting. The at least one regularization technique (in particular the at least one machine learning method) can in particular be selected from the group comprising:

Bayesian linear regression,

Bayesian neural network by concrete dropout, or Bayesian neural network by variational inference, adaptive Bayesian spline regression (also referred to as Bayesian adaptive spline regression).

The above methods already include an estimation of aleatory and/or epistemic uncertainties. In particular, Bayesian neural networks allow the mapping of heteroscedastic uncertainties, i.e., uncertainties whose magnitude depends on the expected value of the estimated target variable (turbine condition).

Alternatively (or additionally), these can be determined during the training time period and during the training process, respectively, by other methods (in particular bootstrapping).

After the training, a trained machine learning model can be made available for further use in step 308.

Figure 4:
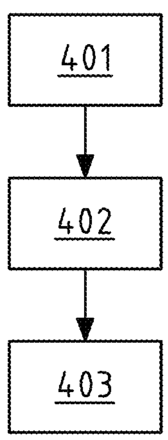
FIG. 4 is a diagram of a further embodiment of a method according to the present application.

FIG. 4 shows a diagram of an embodiment of a method for using a machine learning model trained according to the present application, for example according to the embodiment example to FIGS. 2 and/or 3.

In a first step 401, an inputting of at least one operation data set (preferably a plurality of operation data sets) of a further wind turbine into the machine learning model is performed. Preferably, the operation data sets detected over a certain period of time (in particular of at least 2 months, preferably of at least 3 months (and e.g., at most 24 months)) can be input. Preferably, the further wind turbine is of the same, at least similar, type as the reference wind turbine. Preferably, in addition, the further wind turbine may be comprised by the same wind farm as the reference wind turbine (cf. e.g., FIG. 1). It shall be understood that the further wind turbine may also be from a different wind farm.

In step 402, an outputting, by the machine learning model, of at least one turbine condition data set is performed. The turbine condition data set may contain, for example, at least one determined fatigue load indicator of the further wind turbine. It shall be understood that another load parameter indicator may also be output.

In an optional step 403, a determining of the remaining operating time (RUL) of the further wind turbine may be performed based on the at least one output turbine condition data set of the further wind turbine. In particular, this comprises determining, in particular estimating, the RUL of at least one component of the further wind turbine.

By training, according to the application, a machine learning model with load data and operating data of a reference wind turbine in order to recognize patterns between these data and to "store" them accordingly in the trained machine learning model, at least the turbine condition of a further wind turbine can be determined, in particular estimated with a high reliability only on the basis of the operating data of this further wind turbine (i.e., without an actual measurement of a load parameter) by means of the trained machine learning model. As has already been described, the turbine condition of the wind turbine comprises the state of one (or more) structural component(s) of the wind turbine.

Figure 5:
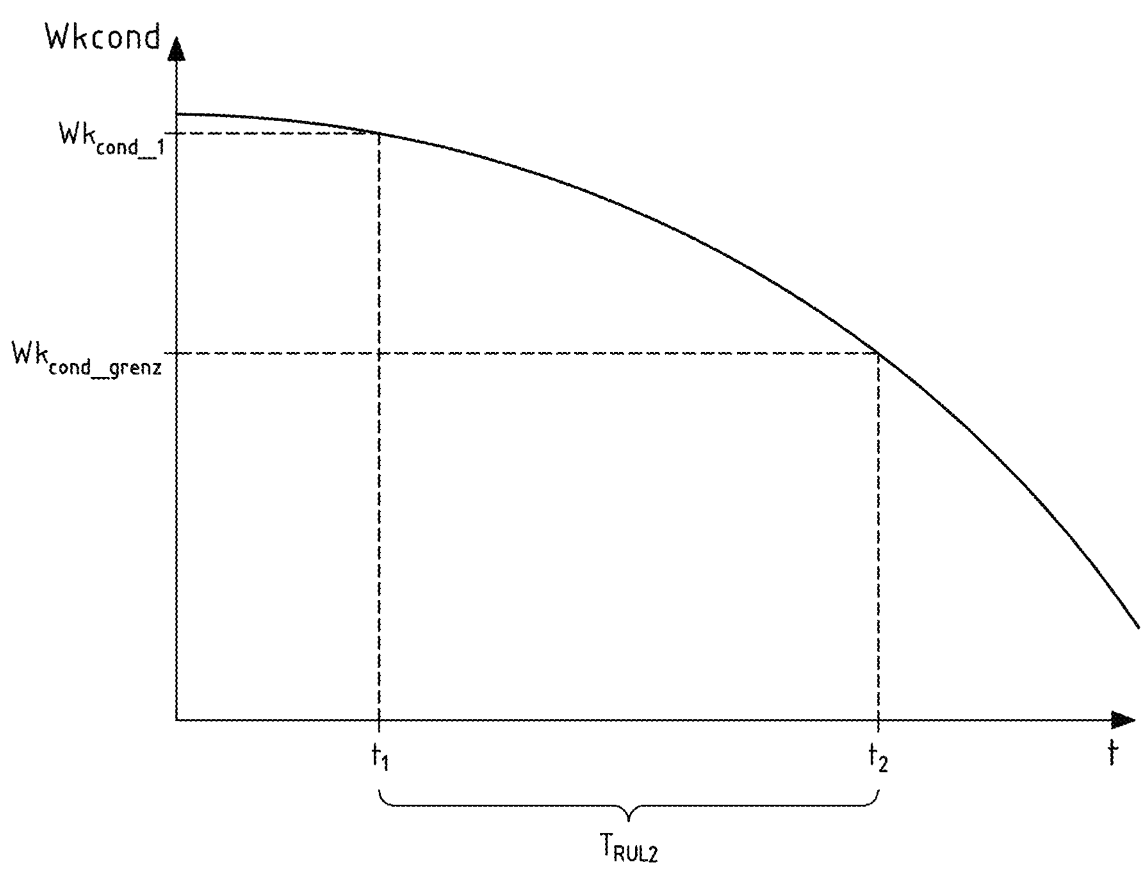
FIG. 5 is an exemplary turbine condition diagram.

FIG. 5 shows an exemplary turbine condition diagram, with the help of which in particular the RUL can be determined, i.e., in particular estimated.

On the y-axis the turbine condition $WK_{cond}$ of the wind turbine respectively component condition $WK_{cond}$ of a structural component of the wind turbine is shown and on the x-axis the time t is shown.

At first it can be assumed that at the (instantaneous) time $t_1$ the (instantaneous) plant state is $WK_{cond\_1}$. This can be determined in particular according to the procedure of FIG. 4.

The determined turbine condition limit value $WK_{cond\_grenz}$ can be predetermined. Then the time $t_2$ can be determined with the help of models as described. In particular, the time $t_2$ is the time from which the wind turbine can probably no longer be operated (for safety reasons). Then the RUL and $T_{RUL}$, respectively, can be calculated generally as follows: $T_{RUL}=t_2-t_1$.

Figure 6:
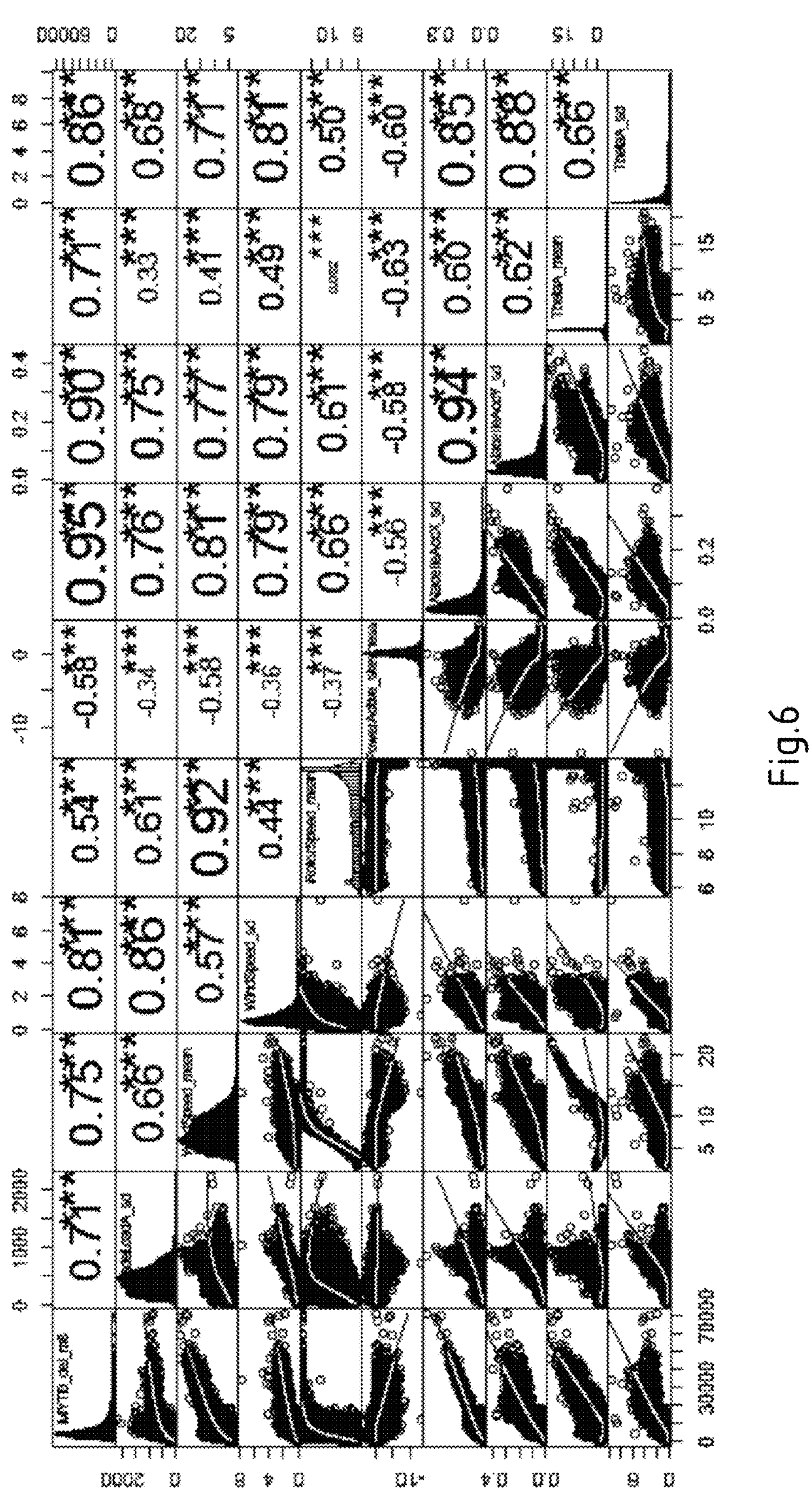
FIG. 6 is an exemplary diagram for testing collinearity by correlation.

FIG. 6 shows an exemplary diagram illustrating the checking of collinearity by correlation, such as may be performed in step 305.

As can be seen in particular from FIG. 6, the correlations (e.g., expressed e.g., by Pearson's correlation coefficient in the interval [−1 . . . , 1]) of the operation parameters intended for use are calculated among each other. Operation parameters with a high correlation coefficient (typically >=0.8 to 0.9 or <=−0.8 to −0.9) are called collinear and should not be used together for training machine learning methods.

Figure 7:
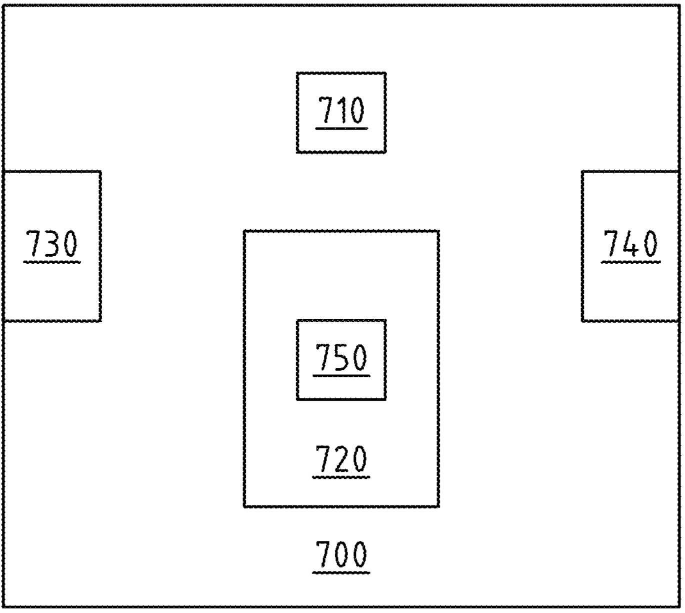
FIG. 7 is a schematic view of an embodiment of a computing device according to the present application.

FIG. 7 shows a schematic view of an embodiment of a computing device 700 according to the present application. The computing device 700 comprises at least one processor (e.g., microprocessor, DSP, FPGA, and/or the like) and at least one data memory 720 containing computer program code. In particular, the data memory 720 contains the trained or yet-to-be-trained machine learning model 750.

Furthermore, at least one communication interface 730 and/or at least one user interface 740 is provided, which is configured to input and/or output data, such as operation data sets, training data sets, and/or turbine condition data sets.

The data memory 720 and the processor 710 are configured to cause the computing device 700 to generate at least one turbine condition data set based on at least one provided operation data set and at least partly using a machine learning model 750 trained, for example, according to the embodiment according to FIG. 2 and/or FIG. 3.

It should be understood that the figures illustrate exemplary embodiments in detail, and it should be understood that the present application is not limited to the details or methodology set forth in the description or illustrated in the figures. It should also be understood that the terminology is for purpose of description only and should not be regarded as limiting.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context

The invention claimed is:

1. A computer-implemented method for training a machine learning model used for determining a remaining useful life of a further wind turbine, comprising:

providing a plurality of operation data sets of a reference wind turbine;

providing a plurality of load data sets of the reference wind turbine, wherein a load data set is based on at least one load parameter measured at the reference wind turbine; and generating a plurality of wind turbine training data sets for training the machine learning model by synchronously assigning a respective operation data set with a respective load data set, wherein the plurality of wind turbine training data sets are in the form of text data, from which a presentation in form of a vector, a matrix, and/or a tensor is generated, and wherein the step of generating the plurality of wind turbine training data sets comprises the step of generating approximately 100.000 wind power training data sets; and training the machine learning model on the plurality of wind turbine training data sets.

2. The method according to claim 1, wherein the step of training the machine learning model comprises the step of training the machine learning model on the plurality of wind turbine training data sets during a training time period.

3. The method according to claim 2, wherein at least one regularization technique is applied during the training time period, wherein the regularization technique is selected from a group comprising:

linear Bayesian regression,

Bayesian neural network with concrete dropout,

Bayesian neural network with variational inference adaptive Bayesian spline regression.

4. The method according to claim 2, wherein a portion of the generated wind turbine training data sets is used as validation data sets during the training time period.

5. The method according to claim 4, wherein during the training time period, a model for estimating aleatory and/or epistemic uncertainties is applied, wherein the estimation is achieved by applying at least one machine learning method, wherein the machine learning method is selected from a group comprising:

linear Bayesian regression,

Bayesian neural network with concrete dropout,

Bayesian neural network with variational inference adaptive Bayesian Spline Regression, and/or wherein the estimation is implemented by bootstrapping.

6. The method according to claim 1, wherein a provided operation data set contains at least one operation parameter of the reference wind turbine, wherein the at least one operation parameter is selected from a group comprising:

tower top acceleration, pitch angle, pitch speed, rotor speed, electrical power, nacelle wind speed.

7. The method according to claim 6, wherein an operation data set comprises as operation parameter value of an operation parameter at least one operation parameter value selected from a group comprising:

maximum operation parameter value detected during an operating data time period, minimum operation parameter value detected during the operation data time period, operation parameter mean value determined from the operation parameter values detected during the operation data time period, standard deviation determined from the operation parameter values detected during the operation data time period.

8. The method according to claim 1, wherein a provided load data set is based on at least one measured load parameter of the reference wind turbine, wherein the load parameter is selected from a group comprising:

blade root load parameter, rotor load parameter, tower load parameter, tower torsion parameter, tower top moment parameter.

9. The method according to claim 8, wherein the method comprises:

measuring the at least one load parameter of the reference wind turbine.

10. The method according to claim 9, wherein measuring the at least one load parameter is performed according to the IEC 61400-13 standard [2], Edition 1, 2001.

11. The method according to claim 8, wherein as load parameter value of a load parameter a load parameter value is provided, selected from a group comprising:

maximum load parameter value measured during a load data time period, minimum operation parameter value measured during the load data time period, load parameter mean value determined from the load parameter values measured during the load data time period, standard deviation determined from the load parameter values measured during the load data time period.

12. The method according to claim 1, wherein the method comprises:

measuring the at least one load parameter of the reference wind turbine during a measurement time period; and detecting operational data parameter values of the reference wind turbine during the measurement time period.

13. The method according to claim 12, wherein the measurement time period is at least 3 months.

14. The method according to claim 1, wherein the method comprises:

forming a load data set by converting the at least one measured load parameter value of the reference wind turbine into at least one fatigue load indicator.

15. The method according to claim 14, wherein the converting is based on a Rainflow Counting method.

16. The method according to claim 1, wherein the machine learning model is and/or comprises an artificial neural network.

17. A method of using a machine learning model trained according to claim 1, comprising:

inputting at least one operation data set of the further wind turbine into the machine learning model, and outputting, by the machine learning model, at least one turbine condition data set.

18. The method according to claim 17, wherein the further wind turbine is a wind turbine type identical to the wind turbine type of the reference wind turbine, and/or the further wind turbine and the reference wind turbine are comprised by the same wind farm.

19. The method according to claim 17, wherein the method comprises:

determining the remaining runtime of the further wind turbine based on the at least one turbine condition data set of the further wind turbine.

20. A computing device comprising at least one data memory containing computer program code and at least one processor, wherein the data memory and the processor are configured such that the computing device is caused to generate at least one turbine condition data set based on at least one provided operation data set and at least in part using a machine learning model trained according to claim 1.

* * * * *